(12) United States Patent
Roybal

(10) Patent No.: US 10,766,087 B2
(45) Date of Patent: Sep. 8, 2020

(54) EXTERNAL PULSE GENERATING DEVICE AND METHOD

(71) Applicant: Jattus LLC, Thornton, CO (US)

(72) Inventor: Matthew Roybal, Thornton, CO (US)

(73) Assignee: JATTUS LLC, Thornton, CO (US)

( * ) Notice: Subject to any disclaimer, the term of this patent is extended or adjusted under 35 U.S.C. 154(b) by 592 days.

(21) Appl. No.: 15/130,690

(22) Filed: Apr. 15, 2016

(65) Prior Publication Data

US 2016/0303676 A1    Oct. 20, 2016

Related U.S. Application Data

(60) Provisional application No. 62/148,088, filed on Apr. 15, 2015.

(51) Int. Cl.
  *B23K 9/09*  (2006.01)
  *B23K 9/10*  (2006.01)

(52) U.S. Cl.
  CPC ............ *B23K 9/091* (2013.01); *B23K 9/1087* (2013.01)

(58) Field of Classification Search
  CPC .............................. B22K 9/091; B23K 9/1087
  USPC ..................................................... 219/130.51
  See application file for complete search history.

(56) References Cited

U.S. PATENT DOCUMENTS

| 4,246,465 A | 1/1981 | Ericsson |
| 4,742,208 A | 5/1988 | Overman |
| 4,767,912 A | 8/1988 | Eldridge |
| 4,868,366 A | 9/1989 | Joseph et al. |
| 5,726,419 A | 3/1998 | Tabata et al. |
| 6,040,555 A * | 3/2000 | Tiller ................... B23K 9/1087 219/132 |
| 6,800,810 B1 * | 10/2004 | Page ...................... H01B 11/20 174/102 R |
| 7,205,503 B2 | 4/2007 | Reynolds et al. |
| 8,487,216 B2 | 7/2013 | Reynolds et al. |
| 8,653,413 B2 | 2/2014 | Vogel et al. |

(Continued)

FOREIGN PATENT DOCUMENTS

| CN | 203426573 U | 2/2014 |
| DE | 10249079 A1 | 5/2004 |

(Continued)

OTHER PUBLICATIONS

WeldingWeb.com (Jun. 3, 2013) "My Diversion 165 does pulse TIG—yours can too!" Thread Posted by User miniman82. Accessible on the Internet at URL: http://weldingweb.com/showthread.php?281131-My-Diversion-165-does-pulse-TIG-yours-can-too!. [Last Accessed Apr. 21, 2016].

(Continued)

*Primary Examiner* — Lorne E Meade
*Assistant Examiner* — Kuangyue Chen
(74) *Attorney, Agent, or Firm* — Lathrop GPM LLP

(57) ABSTRACT

The present invention provides a unique and novel, low-cost external assembly that can be used to add a pulsed current functionality to a continuous welding machine. The external assembly is located in series between a pedal for controlling the welder and the welder itself. The external assembly includes a controller that modifies the pedal input signal typically entering directly into the welder. The modified signal converts the continuous welding machine such that it operates as a pulsed welding machine.

15 Claims, 15 Drawing Sheets

(56) References Cited

U.S. PATENT DOCUMENTS

| | | | |
|---|---|---|---|
| 2004/0129487 A1* | 7/2004 | Shabana | G05G 1/405 180/315 |
| 2006/0104343 A1* | 5/2006 | Agarwal | H03K 7/08 375/238 |
| 2006/0112866 A1* | 6/2006 | Pfeifer | D05B 11/00 112/117 |
| 2008/0083705 A1* | 4/2008 | Peters | B23K 9/1068 219/61 |
| 2009/0200283 A1* | 8/2009 | Bland | G08C 17/02 219/132 |
| 2009/0272222 A1* | 11/2009 | Long | G05G 1/305 74/560 |
| 2011/0260793 A1* | 10/2011 | Jiang | H03F 3/217 330/251 |
| 2014/0069900 A1 | 3/2014 | Becker et al. | |
| 2015/0266125 A1* | 9/2015 | Enyedy | B23K 9/09 219/136 |
| 2015/0273611 A1* | 10/2015 | Denis | B23K 9/1087 219/132 |
| 2015/0320485 A1* | 11/2015 | Batchelor | A61B 18/08 606/41 |

FOREIGN PATENT DOCUMENTS

| | | |
|---|---|---|
| WO | WO 2014/039878 A2 | 3/2014 |
| WO | WO 2014/140767 A2 | 9/2014 |

OTHER PUBLICATIONS

YouTube.com (May 13, 2013) "Miller Diversion 165/180 DIY Pulse TIG Box," Uploaded by User Nickolas Williams. Accessible on the Internet at URL: http://www.youtube.com/watch?v=8Eg435Tong8. [Last Accessed Apr. 21, 2016].

* cited by examiner

802

804

EXTERNAL PULSE GENERATING DEVICE AND METHOD

CROSS-REFERENCE TO RELATED APPLICATIONS

This application claims the benefit of priority from U.S. Provisional Patent Application No. 62/148,088, filed Apr. 15, 2015, which is hereby incorporated by reference to the extent consistent with the disclosure of this application.

FIELD

Embodiments herein are in the field of systems for arc welding and providing a digital control signal to a welder with an otherwise constant current. Embodiments herein have applicability at least with gas metal arc welding systems (GMAW), such as metal inert gas (MIG), metal active gas (MAG), and tungsten inert gas (TIG) welders.

BACKGROUND

Gas metal arc welding (GMAW) is commonly referred to by one subtype, such as metal inert gas (MIG) welding or another subtype, such as metal active gas (MAG) welding, where the shielding gas may be either inert or active, respectively. In these welding processes, an electric arc forms between a consumable wire electrode and the workpiece metal(s), which heats the workpiece metal(s), causing them to melt, and join. Along with the wire electrode, a shielding gas feeds through the welding gun, which shields the process from contaminants in the air. The process can be semi-automatic or automatic. Typically, a constant-voltage, direct current power source is used with GMAW, but constant-current systems, also known as continuous systems, as well as pulsing current systems, can be used.

Another welding subtype is the tungsten inert gas (TIG) welder. In this case, a consumable wire electrode is heated by an ark emitted from tungsten, and the shielding gas is inert. Some TIG and GMAW welders have a pulsing feature built into the welder. The user may access these pulsing settings from the control panel on the front of the welder.

To operate typical continuous welders, the operator applies pressure to an input pedal, which feeds a control signal to the welder. The input pedal provided with a typical continuous TIG or GMAW welder contains a potentiometer and a switch. The potentiometer can be based on a sweeper or a plunger to create the proportional signal. The signal is proportional to the position of the input pedal, producing a pedal position signal, which can vary between 0 and 100%. The welder machine sends inputs a +10 volt or other arbitrary value, such as +5 volts, into the input pedal's potentiometer, and a pedal position signal proportional to the position of the input pedal is sent back out into the machine. For example, when the input pedal is not depressed, a signal equal to zero is returned to the machine. In that case the pedal position signal would be equal to 0 volts, indicating that the input pedal is not pressed. When the input pedal is depressed half way down, a pedal position signal of 5 volts would be returned to the machine, indicating that the input pedal is pressed half-way down. When the input pedal is fully depressed, the full 10 volts would be returned to the machine, indicating that the input pedal is pressed all the way down. These three voltages are just examples, since a continuous range of values between 0 and 10 Volts is possible. Typically, the potentiometer can produce Voltages in steps of approximately 0.1 Volts.

The welder machine also sends +10 volts to a switch inside the input pedal, and this output is sent back to the machine as well. The switch activates and closes the circuit when the input pedal is pressed down approximately 10 percent. When the welder machine detects a minimum of 10 percent of the switch voltage, the torch is activated. Once the torch is activated, it uses the pedal position sensor to indicate how many amps to output to the torch.

In contrast, for a pulsed operation welder, the pedal sends the voltage signal to the welder. This voltage signal is received by circuitry in the welder which converts the input voltage signal into a pulsed signal. The pulsed signal is then used to control the torch. Welders that have pulsing features built into the system are significantly more expensive than welders without pulsing features (i.e., continuous welders). Frequently, that price difference can be up to a factor of two, such that a pulsing welder can cost more than twice as much as a continuous version of the same welder.

Embodiments herein provide a device to retrofit a continuous, constant current, welder to replicate the pulsing functions built in to a pulsing welder. Typically, in order to achieve pulsed welding, it is necessary to purchase a welder with those features already included in the welder, which, as discussed above is significantly more in price.

SUMMARY

Accordingly, there is believed to be a need in the welding industry to provide an assembly that when attached to a constant current welder will provide the functionality of a pulsed welder.

In one embodiment, the present invention provides an external assembly that is placed in series between the input pedal and the welder. Typically, a welder has an input pedal that plugs directly into the front or back of the welder, which allows the user to provide input controls to the welder. Since the external assembly of the present invention is placed in series between the input pedal and the welder, it intercepts the continuous pedal position signal going to a welder and creates a pulse weld functionality for the user. The external assembly modifies the low power signal by modifying the current or voltage, or both, to the welder. The welder is connected to a torch controller, and the pulsed signal generated by the external assembly is conveyed directly to the torch controller. In this embodiment, the external assembly is modifying the low power signal between the input pedal and the welder, and therefore the torch controller. The use of the external assembly to modify the signal prior to it entering the welder is a distinction over the prior art. In the prior art, the signal for the torch is either modified at the welder and passed through to the torch controller, or is modified at the torch controller. Modifications at the torch controller require working with a high power signal, involving either high voltage, or high current, or both.

In an aspect, an external pulse generator comprises a controller for use with a welding machine, the controller being located external to the welder and being in communication with a pedal input port for receiving a pedal input signal from a pedal for controlling the welding machine, the pedal input being a digital current value, in communication with a modified pulsed waveform output port for coupling with the welder to output a pulsed modified waveform signal, and in communication with a settings input for receiving settings identifying waveform characteristic settings of the modified pulsed waveform signal; wherein the controller is adapted to, in response to the pedal input signal, generate the pulsed modified waveform signal based upon waveform characteristic settings.

In an embodiment, the pedal input signal includes a pedal potentiometer signal identifying the amount of depression of the pedal by a user. In an embodiment, the pedal input signal includes a pedal depression signal identifying when the pedal is depressed above a threshold. In an embodiment, the controller is adapted to generate the modified pulsed waveform when the pedal depression signal is above the threshold.

In an embodiment, the external pulse generator further comprises a power supply. In an embodiment, the power supply is an independent power supply. In an embodiment, the power supply includes a voltage connection and a ground connection respectively adapted to receive a voltage and ground input from the welder.

In an embodiment, the external pulse generator further comprises power and ground outputs respectively adapted to send a power and ground signal to the pedal. In an embodiment, the pedal input signal and the modified pulsed waveform signal are low power signals.

In an embodiment, the waveform characteristic settings include at least one of: wave type, pulse frequency, percent duty cycle, percent amperage, and a time delay. In an embodiment, the pulsed modified waveform signal includes a plurality of on pulses and a plurality of off pulses. In an embodiment, the on pulses include a plurality of sub-on pulses and a plurality of sub-off pulses.

In an embodiment, the controller including an op-amp circuit coupled with a microcontroller. In an embodiment, the controller includes an op-amp and transistor circuit coupled with a microcontroller.

In an embodiment, the external pulse generator further includes a display and a rotating knob for respectively displaying and selecting the waveform characteristic settings.

In an embodiment, the controller includes a brown-out detector for saving the waveform characteristic settings prior to the controller entering an off state.

In an embodiment, the pedal input signal is adapted for controlling the welder, the welder being a continuous welding system.

In an aspect, a continuous welding system includes a pedal adapted to generate a pedal input signal; a welder adapted to generate a continuous torch based upon the pedal input signal; an external pulse generator coupled in series between the pedal and the welder such that the external pulse generator modifies the pedal input signal into a pulse modified waveform signal, the external pulse generator including a controller having: a pedal input port for receiving the pedal input signal, a modified pulsed waveform output port for coupling with the welder to output the pulsed modified waveform signal, and a settings input for receiving settings identifying waveform characteristic settings of the modified pulsed waveform signal; wherein the controller is adapted to, in response to the pedal input signal, generate the pulsed modified waveform signal based upon waveform characteristic settings. In an embodiment, the external pulse generator further including an independent power supply.

In one embodiment, the external assembly allows the user to input 5 welder settings. These settings include: the wave type, the pulse frequency, the percent duty cycle, the percent amperage, and a time delay.

The external assembly allows the user to select the type of wave that is generated. The different types of waves to be selected include: the square wave, the triangle wave, the sinusoidal wave, and the saw tooth wave.

In another embodiment, the amp percent is defined as the percentage of the maximum possible current that the welder is capable of producing when the input pedal is at 100%. The user setting allows the user to set the maximum possible current for a given weld below the highest output of which the welder is capable. The amp percent setting allows the user to weld small and/or thin work pieces without the fear of accidently putting in too much current. Excess current, beyond that necessary to achieve good welds can lead to warping of the work piece.

As an example, a given GTAW welder may have a maximum possible current output of 200 Amps. The user may set the amp percent at 50%, which would result in a welding current of 100 Amps when the input pedal is fully depressed. Further, the welding current will be proportional to the position of the input pedal, as previously described.

In another embodiment, a graphical user interface (GUI) is provided somewhere on the surface of the external assembly to display the settings selected by the user. The GUI may provide multiple profile tabs that permit the user to quickly select between different settings profiles to use during welding. The GUI may also provide a graph displaying the configuration of the selected wave form. Furthermore, the GUI may also provide a percent bar to indicate the wave form pulsing profile in real time.

In another embodiment, the external assembly draws the electrical power to operate the assembly from an external power source.

In yet another embodiment, the external assembly has an operational mode that allows the input signal from the pedal to electrically bypass the external assembly and control the welder directly, as if the external assembly were not present.

In another embodiment, the external assembly is digital and runs off the Parallax Propeller architecture. The Parallax Propeller is a programmable microcontroller.

In another embodiment, the external assembly signal is pulsed and the current is scaled by the percent the pedal is pressed down.

In yet another embodiment, the external assembly intercepts the pedal position signal and generates a signal consistent with the settings on the external assembly, corresponding to the external assembly signal. These external assembly signals are sent to the welder, which controls the current characteristics of the torch.

In another embodiment, the pedal position signal generated by the potentiometer in the pedal is input into an analog-to-digital integrated circuit (IC) chip housed in the external assembly, which converts the 0-10 volt signal into a 12-bit binary number that the microcontroller can interpret.

In another embodiment, the pedal position is sensed by using an opto-coupler (also known as an opto-isolator or a photo-coupler). The opto-coupler is used to detect when the threshold voltage is present and provides a signal to the microcontroller so that the torch is activated.

In another embodiment, the external assembly will generate a signal based on the pedal position, pedal switch, and the settings the user has defined within the device. To do this, the device uses a digital-to-analog IC chip, where it receives binary data and creates a 0-5 volt analog signal. This signal is then turned into a 0-10 volt signal by using an operational amplifier (op-amp), and is sent to the TIG welder.

In another embodiment, the external assembly has a 1.5" uOLED screen with a resolution of 128×128 pixels. A control device, such as a rotary knob with an integrated push-button, can be used to navigate the software, as well as update settings. A power button may be located on the back of the device.

In another embodiment, the external assembly can be designed as an analog device. The methods for reading the pedal position are also not limited to using an analog-to-digital converter. For instance, if this were designed as an analog device, other methods could be used to read pedal position. Furthermore, the methods for outputting a pedal position are also not limited to using a digital to analog converter, along with an operational amplifier.

In another embodiment, reading the pedal switch as an input is not required. This apparatus could function properly with just detecting the pedal position; the pedal switch in this case is used to get more of an accurate reading of exactly when the welder is going to start welding. This could just be inferred from the pedal position instead.

In another embodiment, the external assembly could also function without the aid of a screen and a user interface. Instead, it can be designed to just have knobs and simple LED lights to indicate that a signal is being generated. Providing a visual display of the settings and the output is not required for the functioning of the apparatus.

The description provided heretofore in no way limits the invention to conform to any specific manufacturer or type of welding machine. In other embodiments, an external assembly can be modified to conform to specific features of different models and types of welding machines. For example, different types/styles of plugs for the pedal interface may be contemplated by this invention. The only thing that would need to be changed is the style of plug, and method of reading the pedal position. This may be possible with a simple adaptor that could be external or internal of the TIG Perfect.

In another embodiment, the external assembly draws its operating power from the welder machine power source.

For written description and enablement support for various embodiments, the following are incorporated herein by reference in their entireties: WO 2014/140,767 A2 to Hillen; U.S. Pat. No. 7,205,503 to Reynolds et al.; WO 2014/039,878 A3 to Becker et al.; U.S. Pat. No. 8,487,216 B2 to Reynolds et al.; U.S. Pat. No. 4,246,465 A to Ericsson; U.S. Pat. No. 8,653,413 B1 to Vogel; U.S. Pat. No. 4,868,366 A to Joseph et al.; and German Pat. No. DE 10,249,079 A1 to Szczesny; U.S. Pat. No. 4,767,912 A to Eldridge; U.S. Pat. No. 4,742,208 A to Overman; and U.S. Pat. No. 4,868,366 A to Joseph et al.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

Other objects, features and advantages of the invention shall become apparent as the description thereof proceeds when considered in connection with the accompanying illustrative drawings.

BRIEF DESCRIPTION OF THE DRAWINGS

In the drawings, which illustrate the best mode presently contemplated for carrying out the present invention.

DETAILED DESCRIPTION

The present invention provides a unique and novel, low-cost external assembly that can be used to add a pulsed current functionality to a constant-current, or continuous, welding machine. The external assembly can serve as a retrofit to a continuous welding machine that allows for ease of installation, flexibility of movement, and the ability to remove and redeploy the apparatus and welding machine as needed.

Embodiments disclosed herein achieve many benefits of using pulsing features for welding when compared with using standard continuous welding characteristics. One of the benefits to using a pulsing feature is that the operator can achieve the same weld penetration with less power and less heat. The advantage of using less heat is that decreasing the total amount of heat put into the workpiece decreases the likelihood that material being welded will warp from the welding process. This is particularly important in welding sheet metal, since excessive heat causes the sheet metal to warp very easily.

Another benefit achieved by embodiments herein is that using a pulsing feature is related to the working duty cycle rating of the welder. The working duty cycle relates to the relationship between the amount of power used while welding, and the amount of time the welder needs to be off to allow the welder to cool off before it can be used again. The less power that is used, the less time the welder needs to cool down, and the more productive an operator can be.

Yet another benefit achieved by embodiments herein is that using a pulsing feature allows the operator to more easily create a uniform and reliable weld. Furthermore, a pulsed weld is typically more visually appealing and gives the appearance of a perfect weld that was created by a machine. The pulsing feature allows the user to go back over unattractive welds that were previously made and improve their appearance.

Before proceeding with the description, it is to be understood that the external assembly herein may be used with all types of welders, welding machines, pedals, and triggers. The external assembly may provide analog-to-digital conversion as well as analog-to-analog operation.

Figure 1:
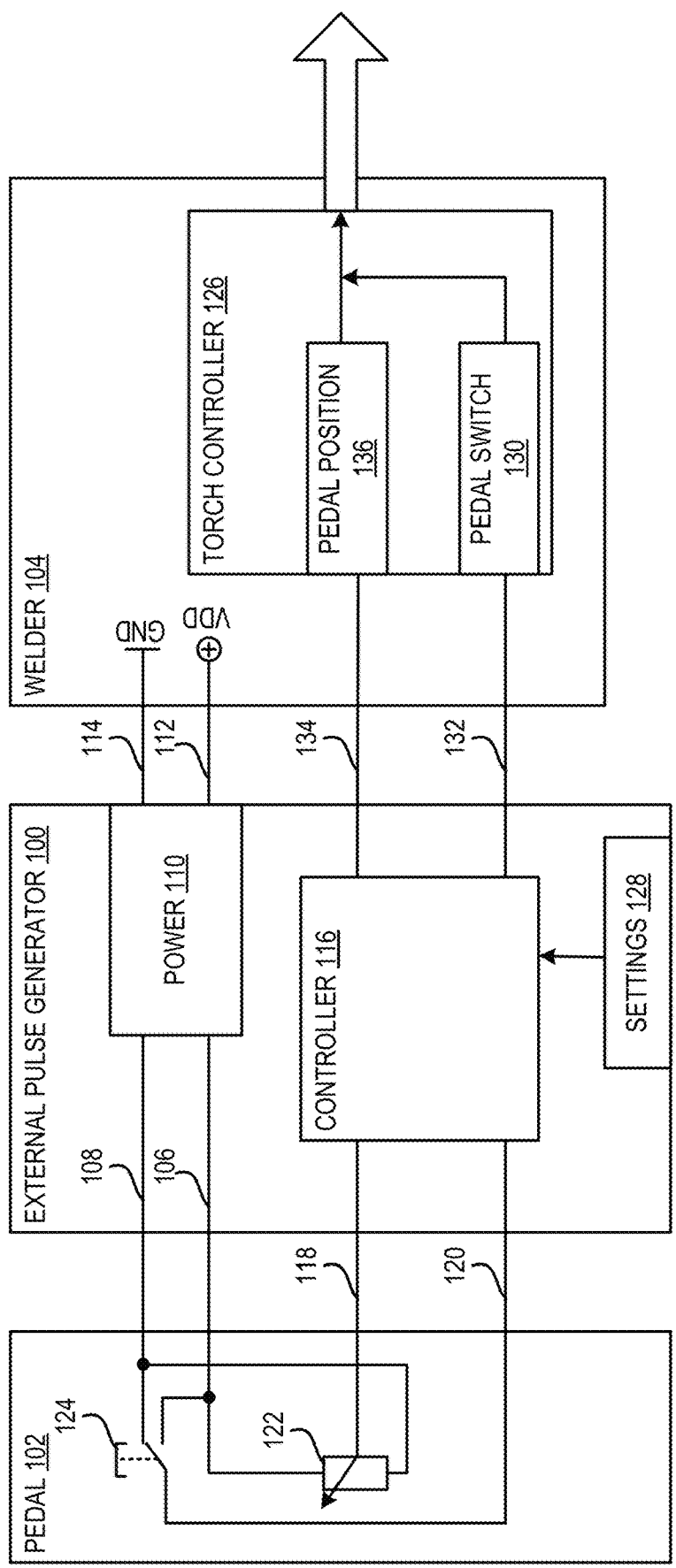
FIG. 1 is an illustration of one embodiment of the external pulse generator placed in series between pedal and welder of a typical continuous welding machine.

FIG. 1 is an illustration of one embodiment of the external pulse generator 100 placed in series between pedal 102 and welder 104 of a typical continuous welding machine. The external pulse generator 100 couples to the pedal via first voltage connection 106 and first ground connection 108. First voltage and ground connections 106, 108, may be generated via a power supply 110 of external pulse generator 100. In embodiments, power supply 110 is an independent power supply that couples to a power outlet. In alternate embodiments, power supply 110 is powered via second voltage connection 112 and second ground connection 114 coupled between power supply 110 of external pulse generator 100 and the ground (GDD) and voltage (VDD) outputs on the welder 104.

External pulse generator 100 includes a controller 116. Controller 116 may be a microcontroller, processor, or other discrete circuitry. Controller 116 receives pedal potentiometer signal 118 and pedal depression signal 120 produced by the potentiometer 122 and pedal switch 124, respectively. Potentiometer signal 118 and pedal depression signal 120 may be low power signals. Potentiometer signal 118 indicates the percent that the pedal is depressed. Pedal depression signal 120 may be a binary signal indicating that the pedal is depressed a certain threshold (i.e. 10%). Controller 116 modifies the low voltage potentiometer signal 118 by modifying the current or voltage, or both, to the welder 104, which is then utilized by the welder 104 to control torch controller 126.

It should be appreciated that in certain embodiments, controller 116 only needs pedal depression signal 120 to operate, and thus embodiments may not include potentiometer signal 118. In such embodiments, controller 116 may monitor pedal depression signal 120 and generate an output signal for controlling welder 104 when pedal 102 is pressed beyond a certain threshold (i.e. 10%) to activate switch 124.

Welder 104 may be a continuous operation welder such that pedal potentiometer signal 118 and pedal depression signal 120 are constant signals. Controller 116 then operates to convert potentiometer signal 118 and/or pedal depression signal 120 into pulsed signals for controlling operation of welder 104.

For example, in an embodiment including both pedal potentiometer signal 118 and pedal depression signal 120, controller 116 may pass the depression value signal 132 of pedal depression signal 120 directly to pedal switch logic 130 of torch controller 126 within welder 104. Pedal switch logic 130 is configured to activate the torch of welder 104 when the pedal is depressed a threshold amount (i.e. 10%). In such embodiment, controller 116 may modify pedal potentiometer signal 118 from a constant waveform to a pulsed waveform signal 134, as discussed below. Pedal position logic 136 then utilizes modified pulsed waveform signal 134 to control operation of the torch of welder 104. In the embodiment illustrated in FIG. 1, pedal switch logic 130 and pedal position logic 136 operate such that torch controller 126 cannot control the torch until the pedal 102 is depressed a threshold amount as determined by pedal switch logic 130. At which time, pedal position logic 136 converts the modified pulsed waveform 134 from low voltage to high voltage/high current It should be appreciated that the term "constant signal" includes, but is not limited to, direct current (DC) signals, as well as rectified analog signals configured to operate as direct current signals. Moreover, the term "analog signal" includes, but is not limited to, analog signals as well as DC signals pulse modulated to operate in an analog fashion.

In an embodiment including only pedal depression signal 120, controller 116 may output a control signal (not shown) to torch controller 126. In such an embodiment, switch 124 is activated when pedal 102 is pressed a threshold amount (i.e. 10%). Controller 116 then outputs a modified waveform to torch controller 126 which controls the torch of welder 104 according to this modified waveform. In other words, there is only one output signal from controller 116 instead of each of depression value signal 132 and pulsed waveform signal 134.

In embodiments, controller 116 may additionally receive setting inputs 128. Setting inputs 128 allow the operator to input various welder settings. These settings may include, but are not limited to, at least one of: wave type, pulse frequency, percent duty cycle, percent amperage, and a time delay. Wave type indicates signal properties of the modified pulsed waveform (i.e. pulsed waveform signal 134) produced by controller, such as triangle, square, sinusoidal, or sawtooth waves. Pulse frequency indicates what frequency of the modified pulsed waveform (i.e. pulsed waveform signal 134). Percent duty cycle indicates what percentage of the duty cycle of the welder the modified pulsed waveform (i.e. pulsed waveform signal 134) is generated at. Percent amperage limits the modified pulsed waveform (i.e. pulsed waveform signal 134) to a given percentage of the maximum operating amperage of the torch. Time delay indicates a given time delay between pedal depression and output of the modified pulsed waveform (i.e. pulsed waveform signal 134), thereby activating the torch of welder 104.

Figure 2:
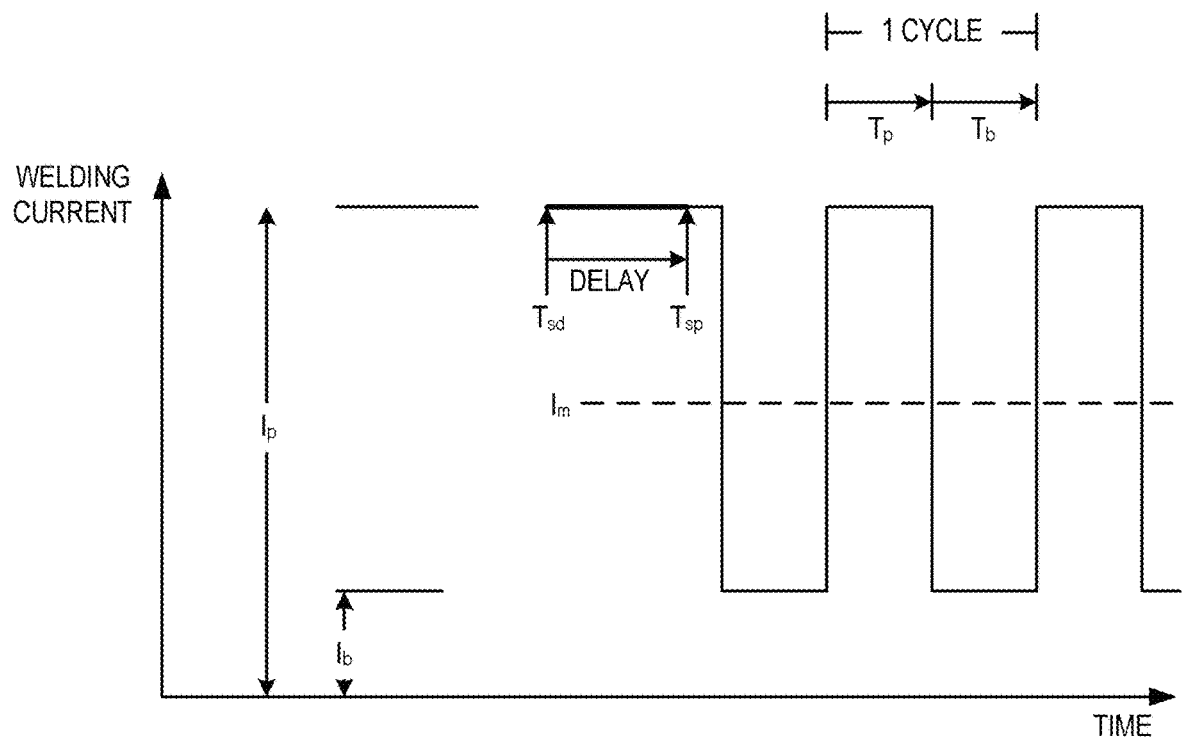
FIG. 2 depicts various aspects of the pulsed modified waveform signal in the form of a square wave as determined by settings of FIG. 1, in one embodiment.

FIG. 2 depicts various aspects of the pulsed modified waveform signal as determined by settings 128 of FIG. 1, in one embodiment. The characteristics of a square wave pulsed welding current as a function of time are defined by a number of parameters illustrated in the figure.

The pulse current, $I_p$, is defined as the "on" current, and the background current, $I_b$, is defined as the "off" current. The background current, $I_b$, must be greater than zero so that the torch remains ignited. The pulse current, $I_p$, can be varied between $I_b$ and the system maximum. In the special case of $I_p$ equal to $I_b$, the welder would be operating in non-pulsed, or continuous mode. The percent amperage setting of setting inputs 128 modifies one or more of the mean current $I_m$, the background current $I_b$, or the pulse current $I_p$ to control the amperage output of the modified pulse waveform (i.e. pulse waveform signal 134).

The period of time when the external assembly is operating at $I_p$ is identified as the pulse duration, $T_p$. The period of time when the external assembly is operating at $I_b$ is identified as the background duration, $T_b$. The cycle time is defined as the sum of the pulse duration, $T_p$, and the background duration, $T_b$. The pulse frequency may be set by the pulse frequency setting of setting inputs 128 and is the inverse of the sum of the pulse durations, described by the equation, pulse frequency (Hz)=$1/(T_p+T_b)$.

The pulse duration and the background duration can be independently controlled based upon the duty cycle setting of setting inputs 128 so that the percent of the duration of time that the current is "on" relative to the duration of time that the current is "off" defines the percent duty, and is described by the equation, percent duty=$(T_p/(T_p+T_b))\times 100\%$.

In another embodiment, FIG. 2 illustrates how the pulse current may be initiated and allowed to persist at $I_p$ prior to the beginning of the pulsing feature. The duration of the initial current is defined as a time delay, and is described by the equation, time delay=$T_{sp}-T_{sd}$. The delay setting of setting inputs 128 modifies when the pulse starts based upon the pulse start time $T_{sp}$ and the pulse delay time $T_{sd}$.

Figure 3:
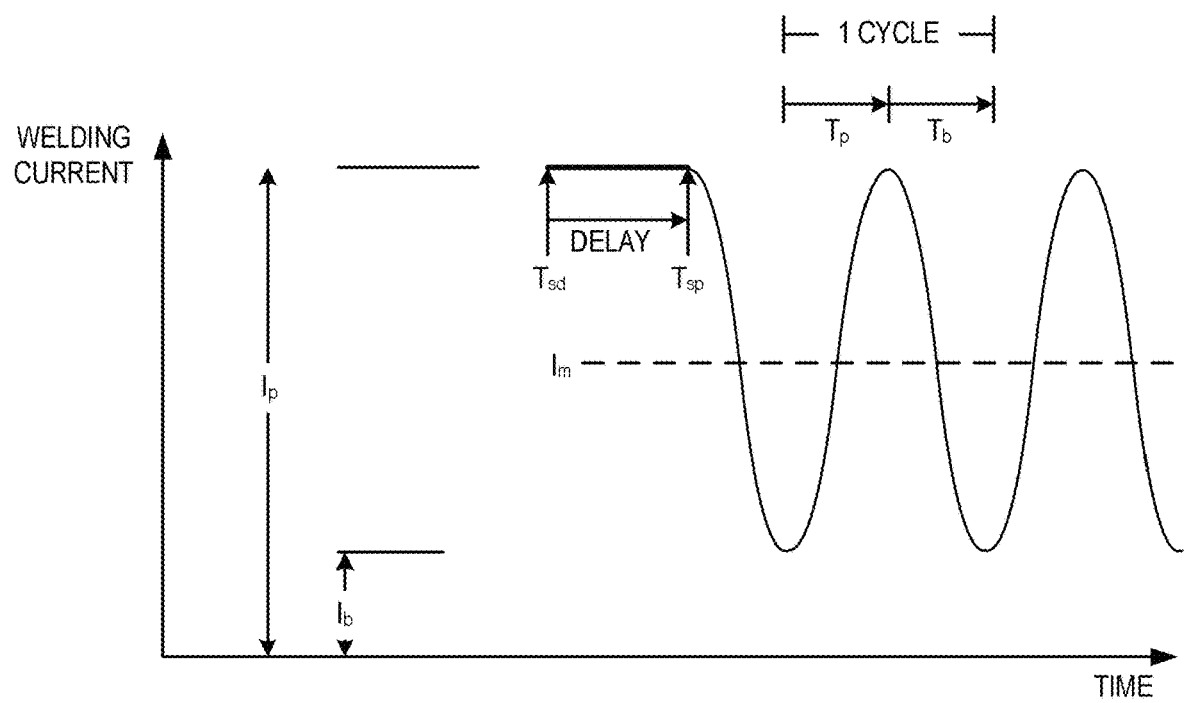
FIG. 3 depicts various aspects of the pulsed modified waveform signal in the form of a sinusoidal wave as determined by settings of FIG. 1, in one embodiment.
Figure 4:
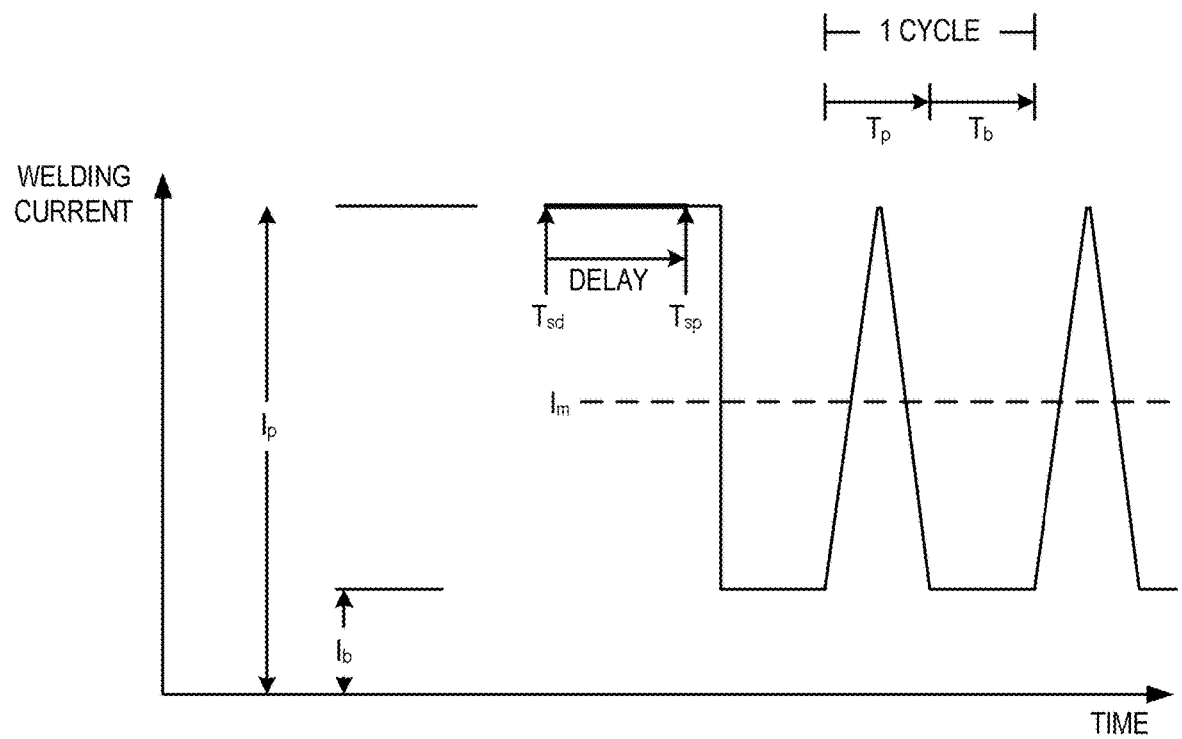
FIG. 4 depicts various aspects of the pulsed modified waveform signal in the form of a triangle wave as determined by settings of FIG. 1, in one embodiment.
Figure 5:
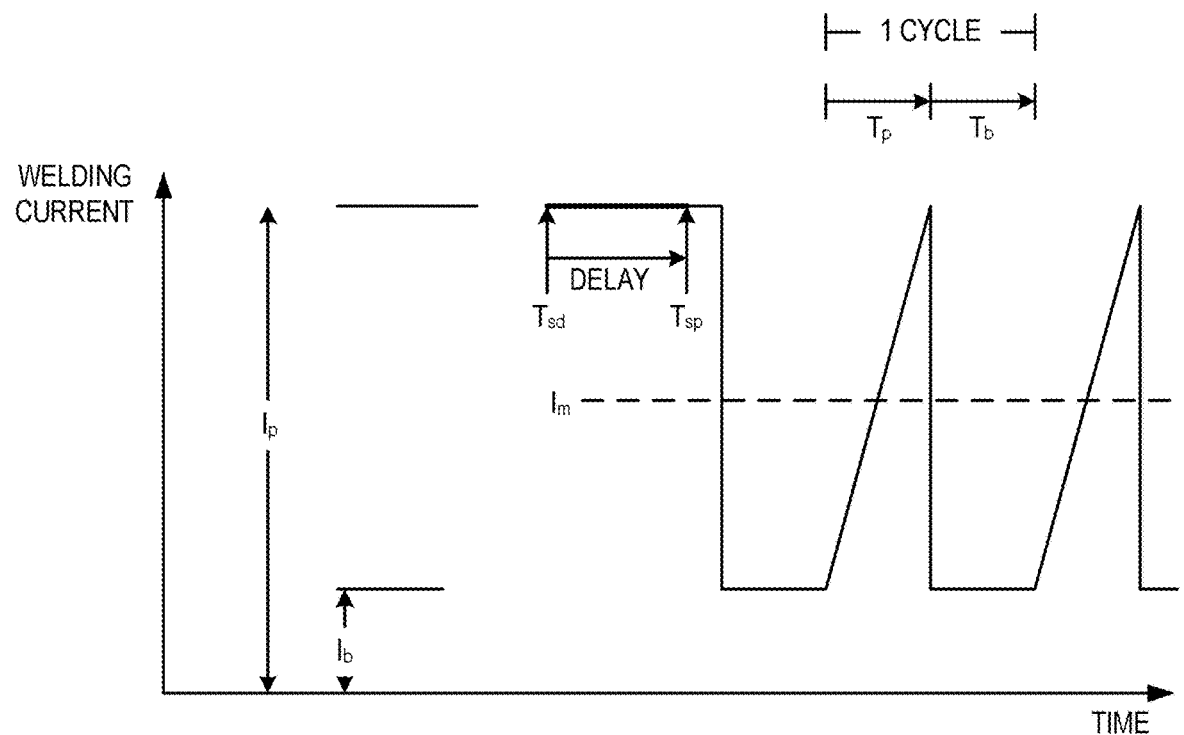
FIG. 5 depicts various aspects of the pulsed modified waveform signal in the form of a sawtooth wave as determined by settings of FIG. 1, in one embodiment.

FIGS. 3-5 provides a non-limiting illustrations of the different types of waves, other than the square wave shown in FIG. 2, available based upon wave type settings, including the triangle wave, the sinusoidal wave, and the saw tooth wave. Each of the waveforms in FIGS. 3-5 may be modified based on pulse frequency, percent duty cycle, percent amperage, and a time delay settings of setting inputs 128 discussed above. The triangle wave is schematically represented by the wave form shown in FIG. 3, the sinusoidal wave is schematically represented by the wave form shown in FIG. 4, and the saw tooth wave is schematically represented by the wave form shown in FIG. 5. It should be appreciated that the values and ratios of $I_p$, $I_b$, $I_m$, $T_p$, $T_b$, $T_{sp}$, and $T_{sd}$ may be modified other than that shown in FIGS. 2-5 without departing from the scope hereof.

Figure 6:
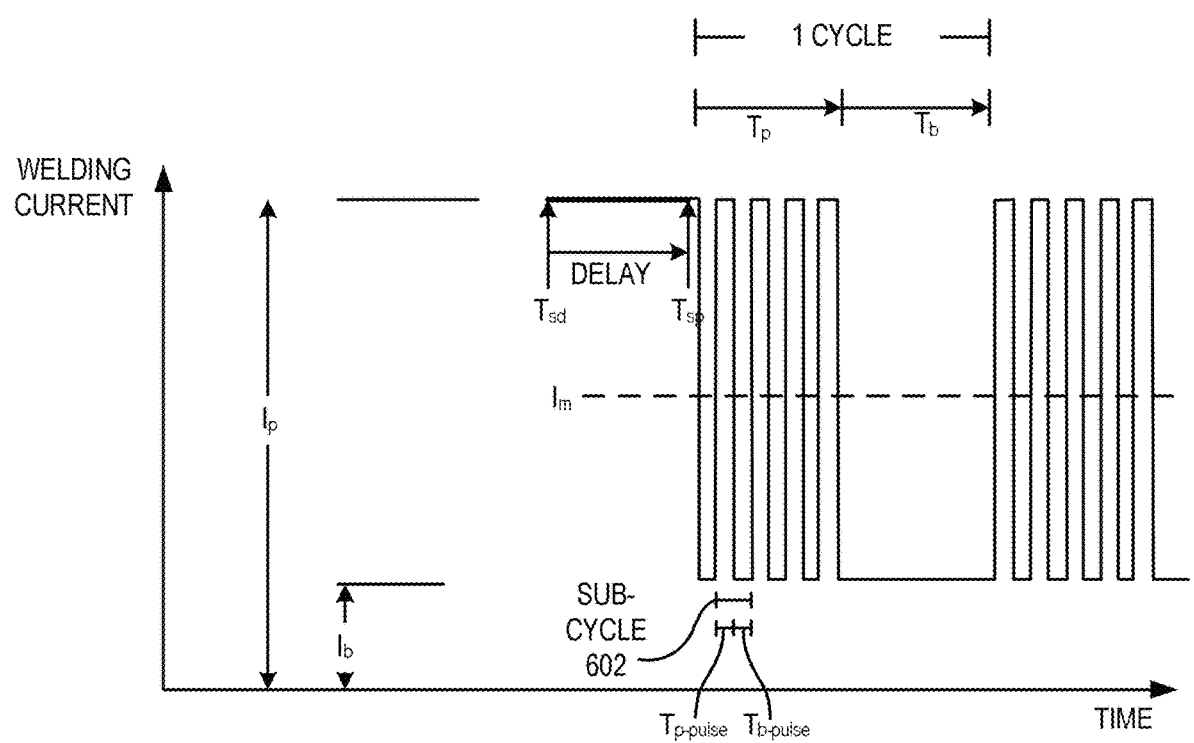
FIG. 6 depicts various aspects of the pulsed modified waveform signal in the form of a square wave having sub-waves during an on-pulse as determined by settings of FIG. 1, in one embodiment.

In another embodiment, FIG. 6 illustrates how the "on" signal could be comprised of a series of pulsed signals. In this embodiment, the pulsed welding current would be defined by two pulsed features superimposed on each other. In FIG. 6, the primary "on pulse" Tp is comprised of a plurality of pulsed sub-cycles 602. The superposition of pulsed sub-cycles 602 can be applied to each signal shape, including the square wave (as illustrated in FIG. 6), the triangle wave, sinusoidal wave, and saw tooth wave. Each sub-cycle 602 includes a an "on" cycle $T_{p\text{-}pulse}$ similar to $T_p$, discussed above, and an off cycle $T_{b\text{-}pulse}$, similar to $T_b$ discussed above.

FIGS. 7 A-7I depict several embodiments of circuit diagrams forming an embodiment of controller 116 of FIG. 1, in one embodiment. Schematics illustrated herein provide circuits that achieve various aspects of the present invention, and in no way should be interpreted to limit the invention to those illustrated here. One or more of the circuit diagrams shown in FIGS. 7 A-I may be utilized as controller 116, or in conjunction with controller 116, of external pulse generator 100.

In FIG. 7 A circuit 702 senses when the welder 104 is turning on and beginning to start an arc. The welder 704 has a built in pedal threshold (say 10%) before it starts to create the arc, so this circuit senses when this occurs. External pulse generator 100 may utilize circuit 702 to decide when to start generating a pulsed waveform. In alternate embodiments, the external pulse generator 100 includes its own threshold and it begins pulsing at 10% pedal throttle as determined by pedal depression signal 120 or pedal potentiometer signal 118.

Figure 7A:
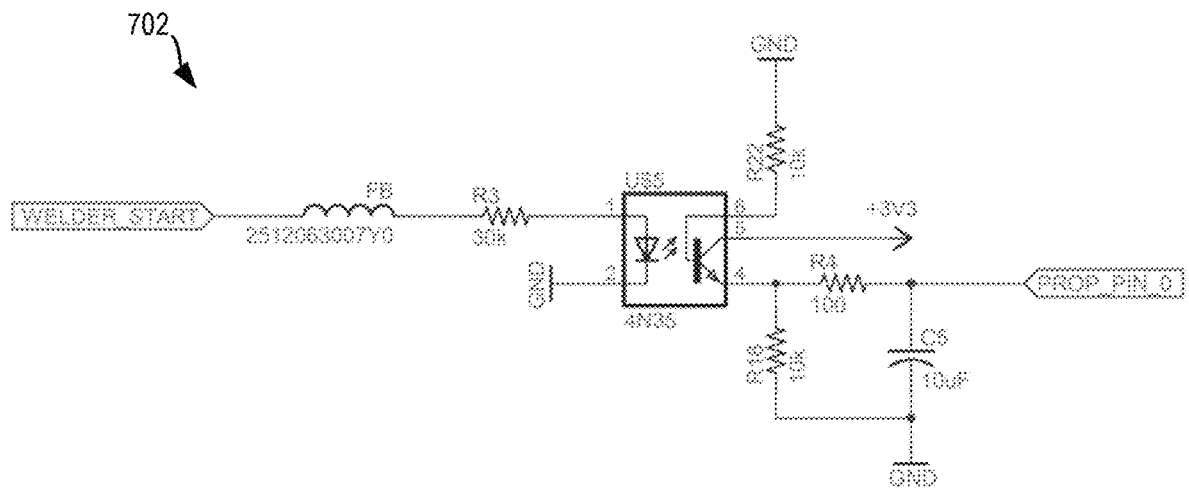
FIGS. 7A-7I depict several embodiments of circuit diagrams forming an embodiment of the controller of FIG. 1, in one embodiment.
Figure 7B:
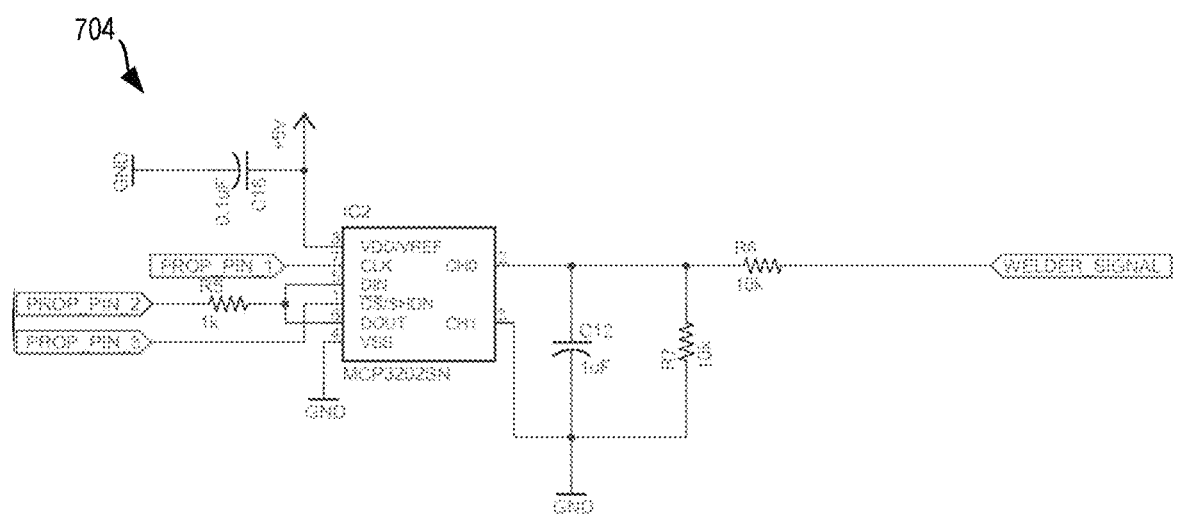

FIG. 7B depicts circuit 704 the pedal potentiometer signal 118 comes into the device and its value is read and converted into a digital number for the microcontroller. The pedal is generating a 0-10 volt signal. This goes through a voltage divider and is converted to a 0-5 volt signal and then goes into an "analog to digital converter".

Figure 7C:
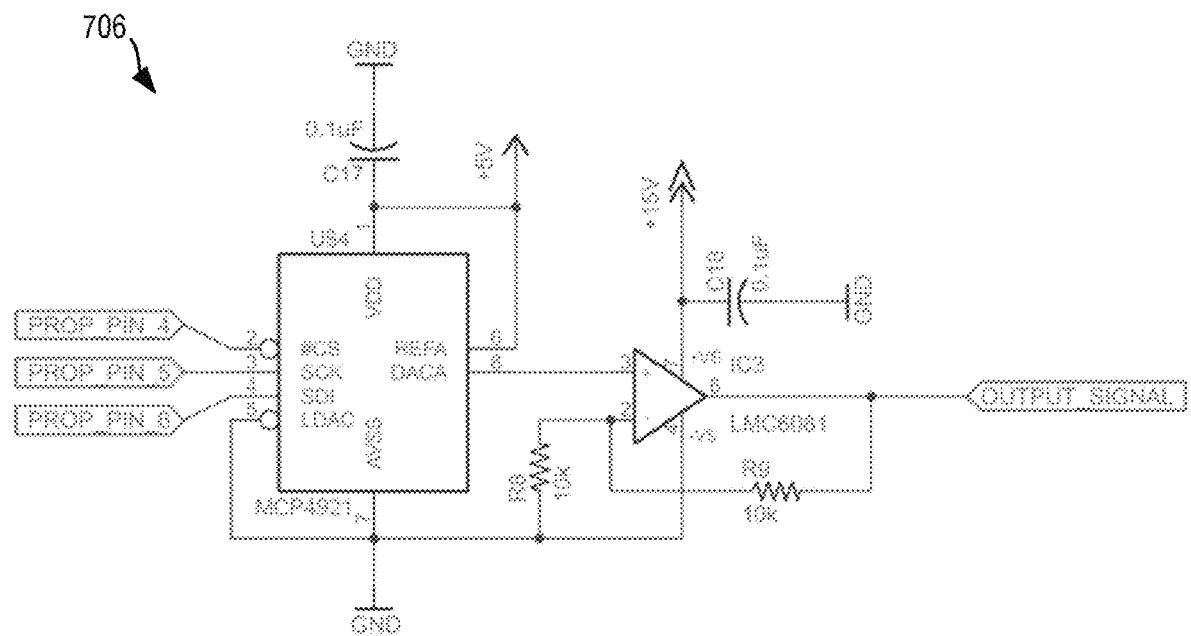

Circuit 706 of FIG. 7C depicts controller 116 outputting a modified pulsed waveform. The output signal of circuit 706 goes into a digital to analog converter which outputs, for example, a 0-5 volt signal. This then transmits into an op-amp and is amplified up to a 0-10 volt signal, which is then sent to the welder 104.

Figure 7D:
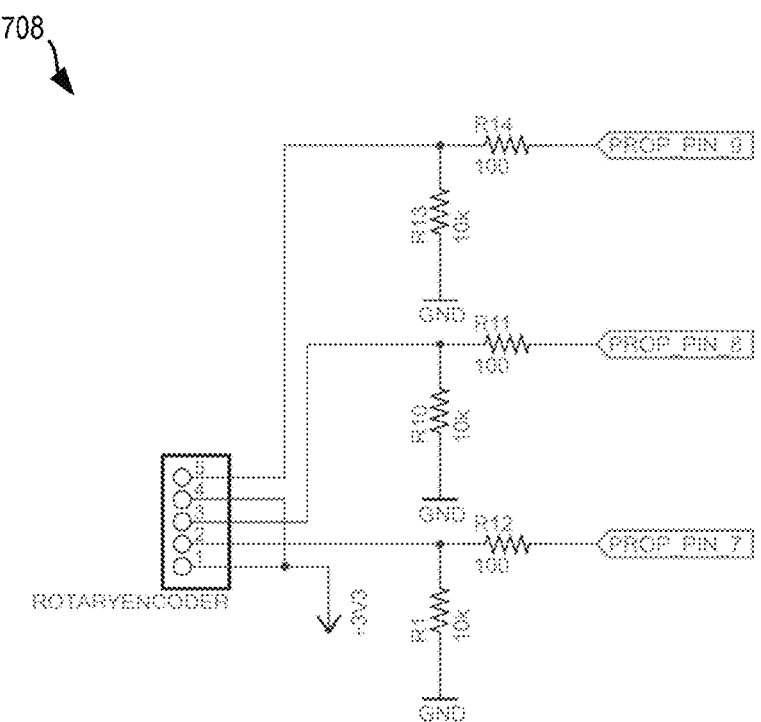

Circuit 708 of FIG. 7D depicts circuitry for a rotating knob for selecting one or more of settings 128.

Figure 7E:
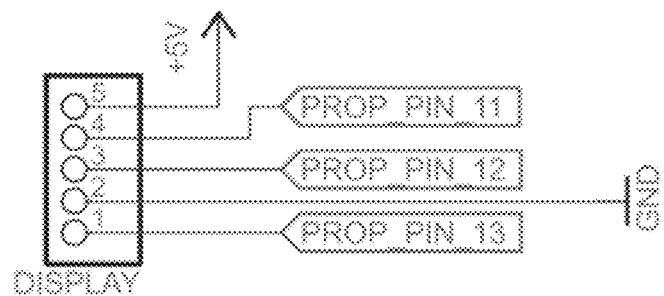

Circuit 710 of FIG. 7E depicts connections for a display screen located on electrical pulse generator, as discussed below.

Figure 7F:
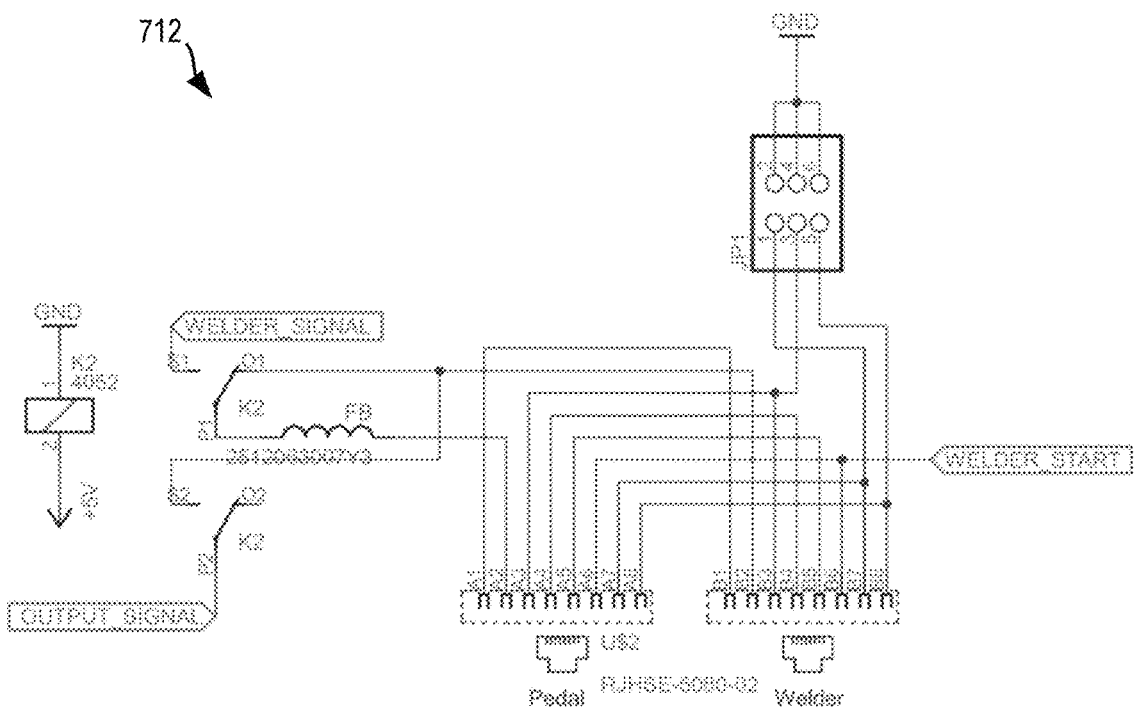

Circuit 712 of FIG. 7F depicts pedal 102 plugging into external pulse generator 100, and the cable that goes to the welder. There is an optional relay in circuit 712 as well. When the external pulse generator 100 is powered off, the pedal signal passes directly through the external pulse generator 100, making it as if the device is not even connected. When power is turned on, the signal may be intercepted via relay and modified through the above circuitry.

Figure 7G:
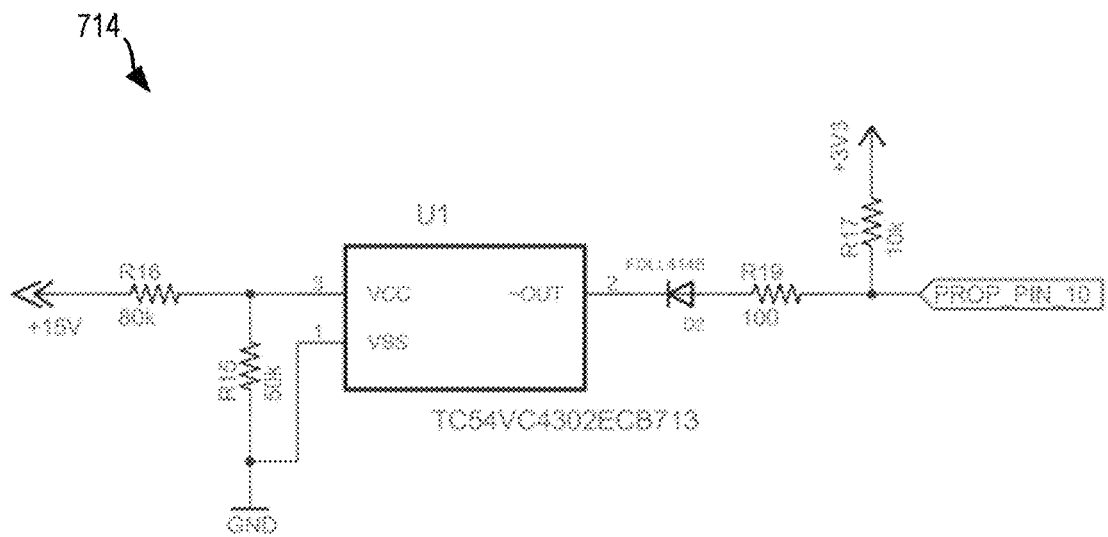

Circuit 714 of FIG. 7G depicts an optional "brown-out detector" used in certain embodiments. When the power is turned off, this triggers the controller 116 to save its settings before power is lost completely.

Figure 7H:
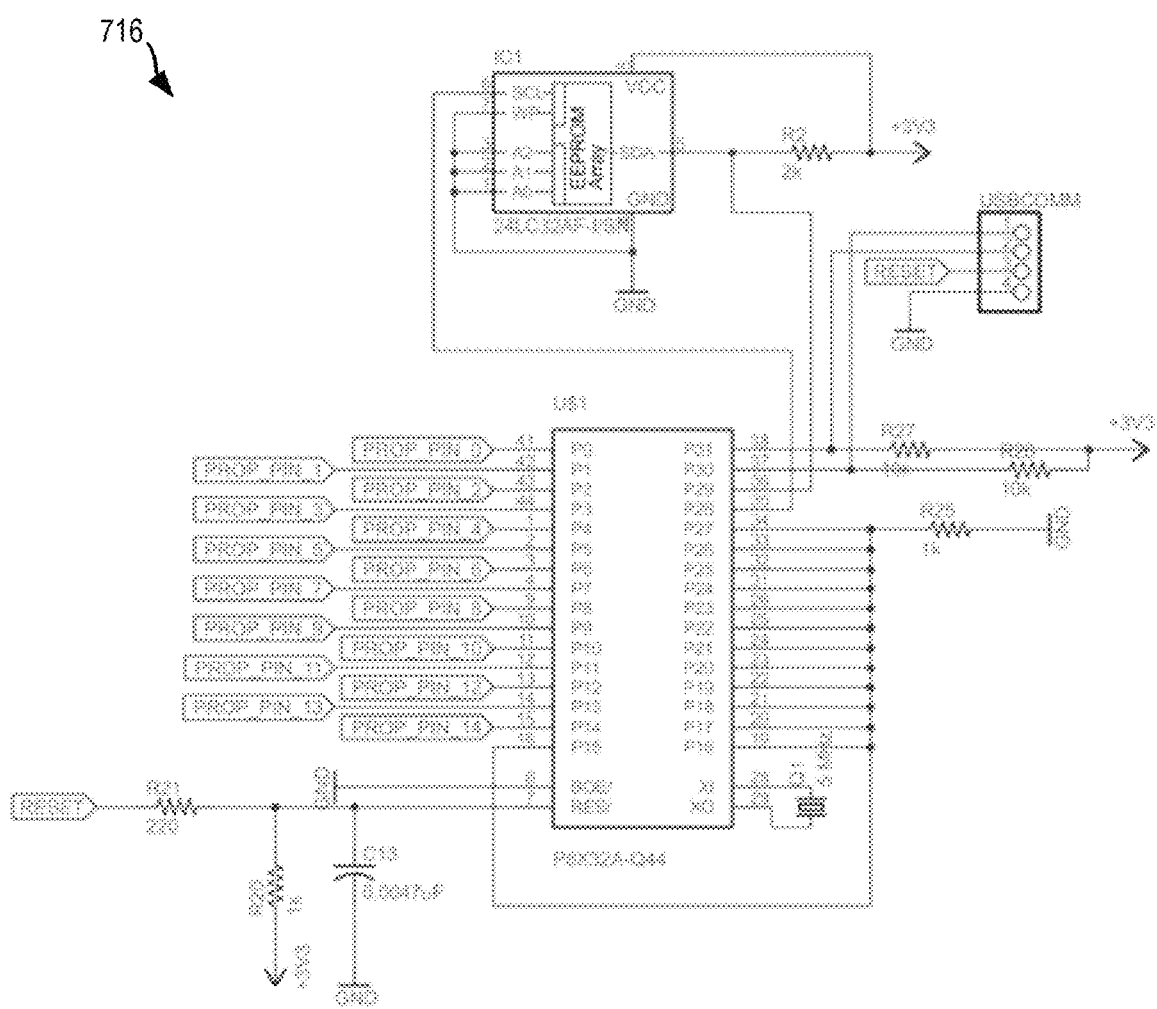

Circuit 716 of FIG. 7H depicts a microcontroller forming controller 116 and eeprom.

Figure 7I:
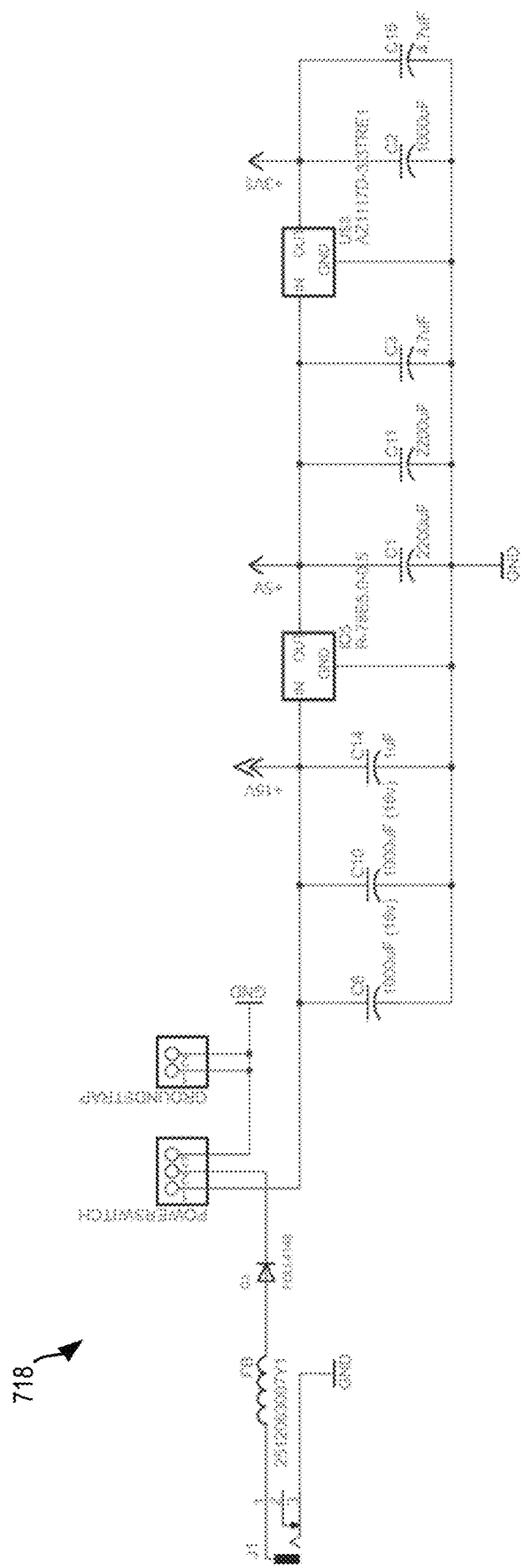

Circuit 718 of FIG. 7I depicts the power rails. The device may be powered from a 12-15 volt power adaptor. This power comes in and goes to a power switch, and then there is a 12-15 volt, 5 volt, and 3.3 volt power rail.

FIGS. 8A-H depict several embodiments of circuit diagrams forming an embodiment of controller 116 of FIG. 1, in another embodiment. Schematics illustrated herein provide circuits that achieve various aspects of the present invention, and in no way should be interpreted to limit the invention to those illustrated here. One or more of the circuit diagrams shown in FIGS. 8A-H may be utilized as controller 116, or in conjunction with controller 116, of external pulse generator 100.

Figure 8A:
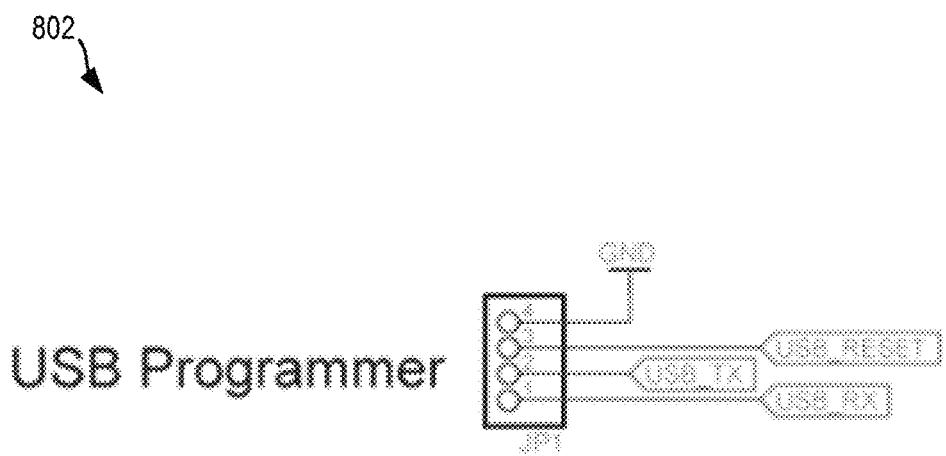
FIGS. 8A-8H depict several embodiments of circuit diagrams forming an embodiment of the controller of FIG. 1, in another embodiment.

In Fig. 8A circuit 802 provides a USB port for configuring external pulse generator 100.

Figure 8B:
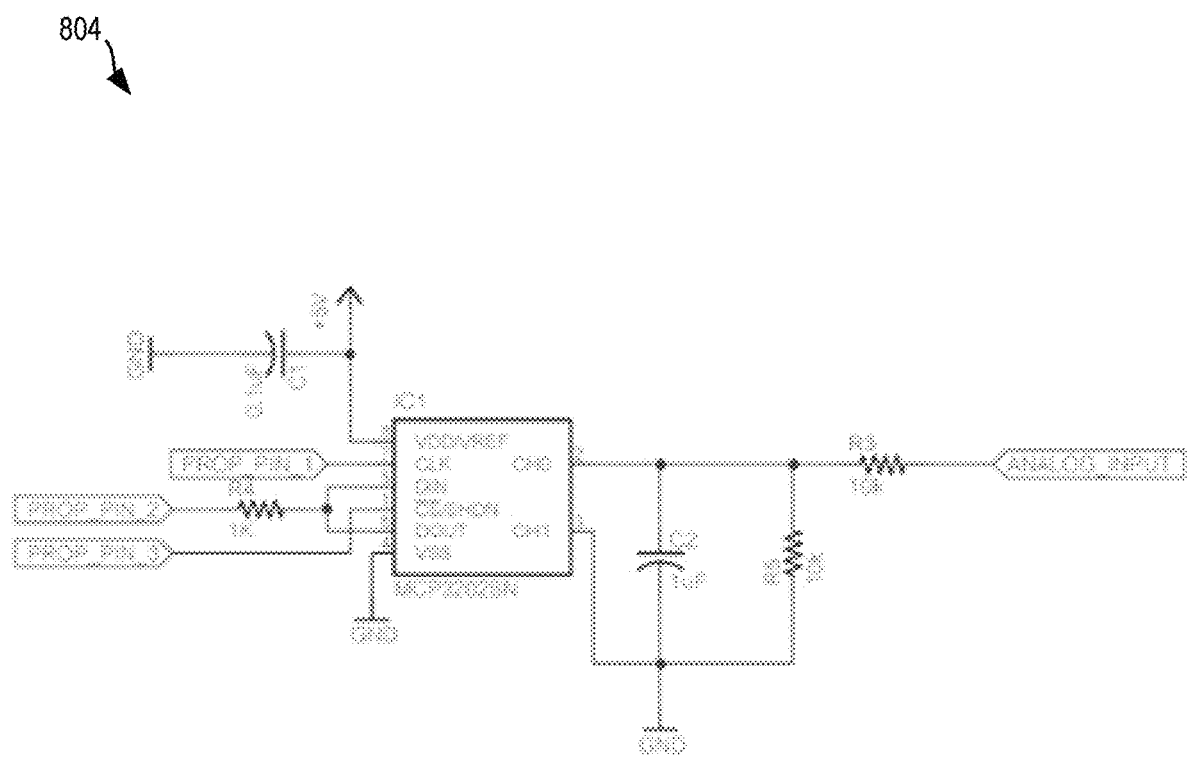

FIG. 8B depicts circuit 804 the pedal potentiometer signal 118 comes into the device and its value is read and converted into a digital number for the microcontroller. The pedal is generating a 0-10 volt signal. This goes through a voltage divider and is converted to a 0-5 volt signal and then goes into an "analog to digital converter".

Figure 8C:
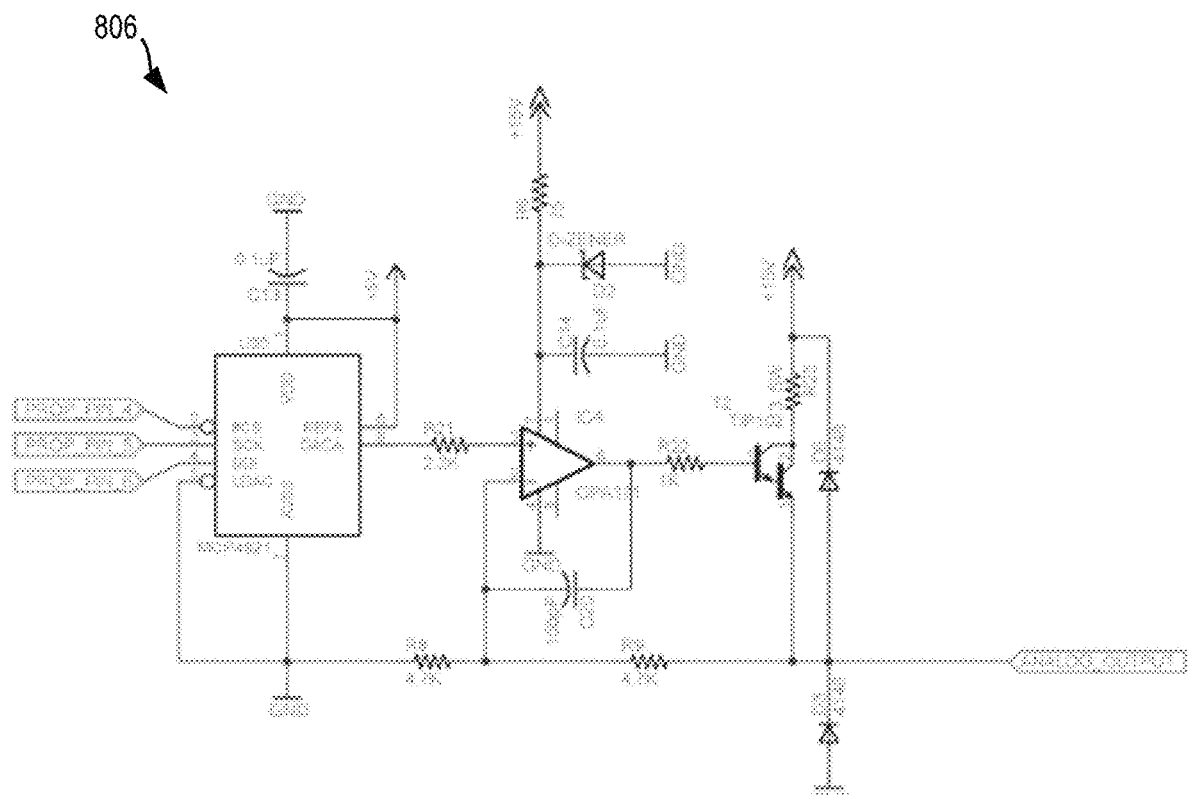

Circuit 806 of FIG. 8C depicts controller 116 outputting a modified pulsed waveform. The output signal of circuit 806 goes into a digital to analog converter which outputs, for example, a 0-5 volt signal. This then transmits into an op-amp in combination with a transistor and is amplified up to a 0-10 volt signal, which is then sent to the welder 104.

Figure 8D:
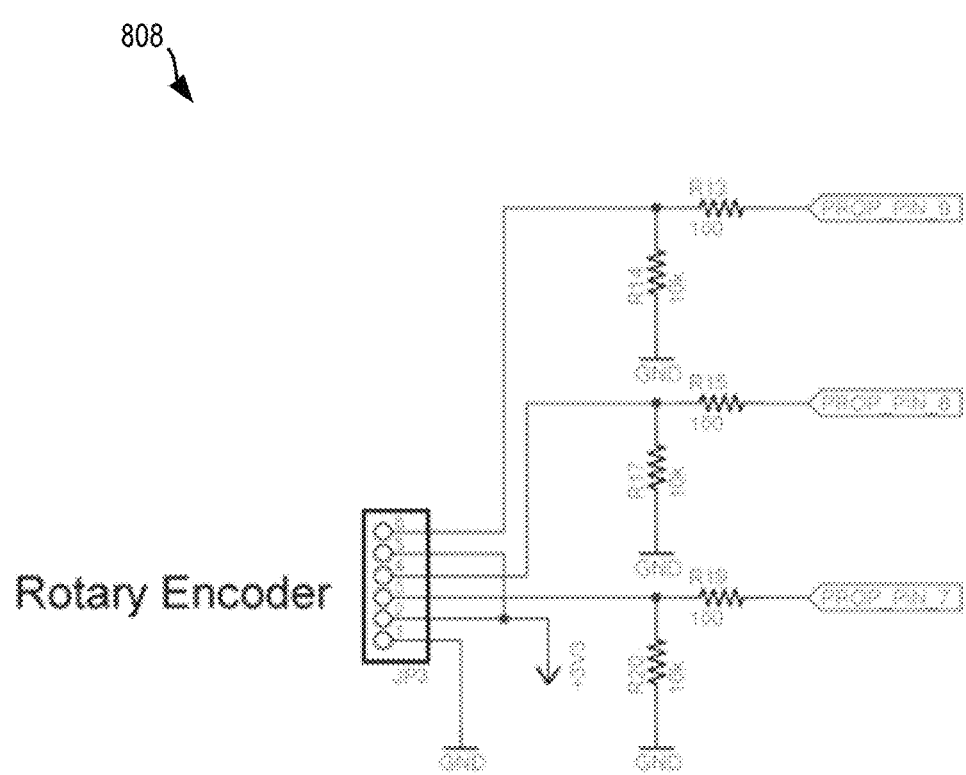

Circuit 808 of FIG. 8D depicts circuitry for a rotating knob for selecting one or more of settings 128.

Figure 8E:
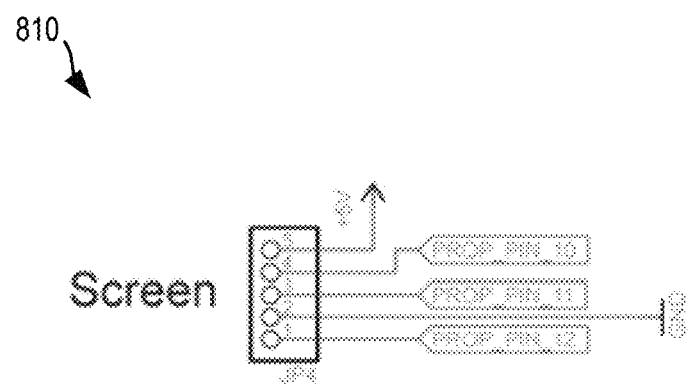

Circuit 810 of FIG. 8E depicts connections for a display screen located on electrical pulse generator, as discussed below.

Figure 8F:
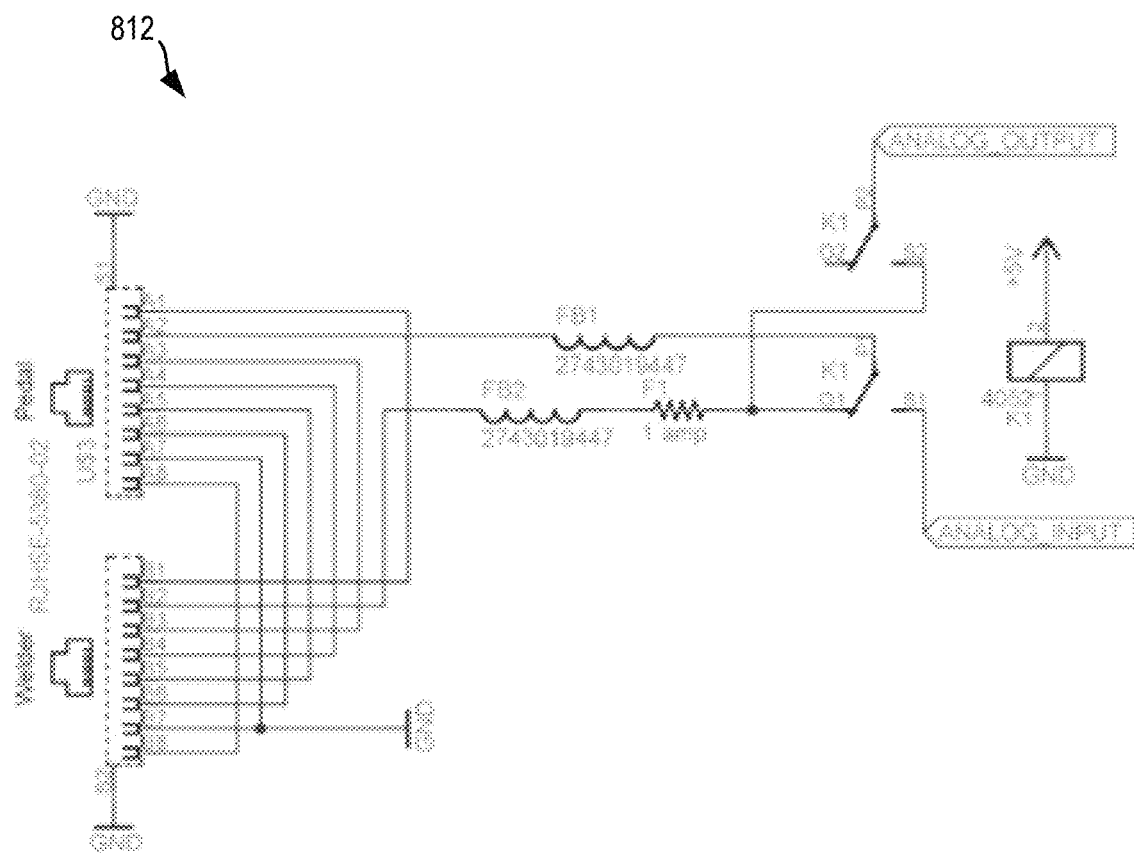

Circuit 812 of FIG. 8F depicts pedal 102 plugging into external pulse generator 100, and the cable that goes to the welder. There is an optional relay in circuit 812 as well. When the external pulse generator 100 is powered off, the pedal signal passes directly through the external pulse generator 100, making it as if the device is not even connected. When power is turned on, the signal may be intercepted via relay and modified through the above circuitry.

Figure 8G:
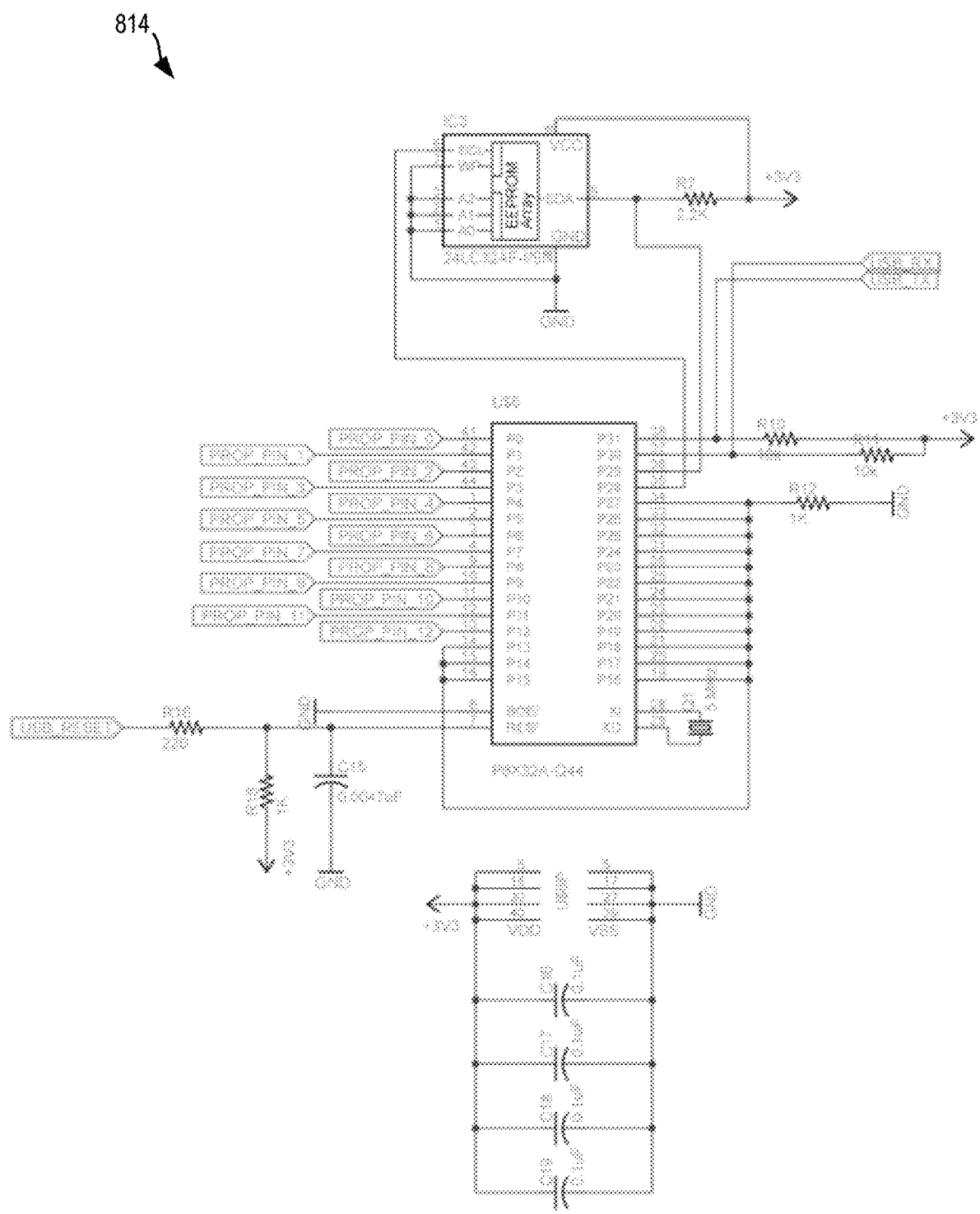

Circuit 814 of FIG. 8G depicts a microcontroller forming controller 116 and eeprom.

Figure 8H:
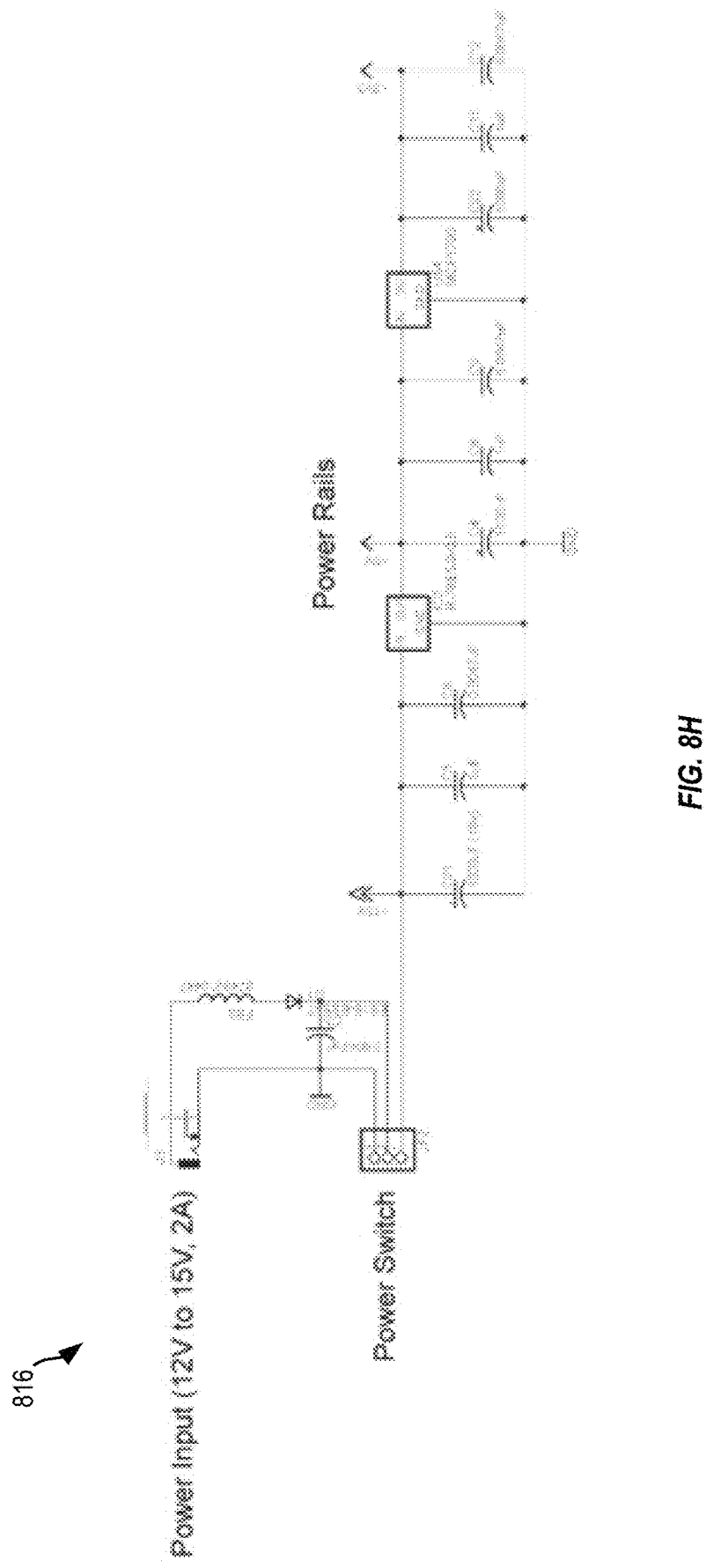

Circuit 816 of FIG. 8H depicts the power rails. The device may be powered from a 12-15 volt power adaptor. This power comes in and goes to a power switch, and then there is a 12-15 volt, 5 volt, and 3.3 volt power rail.

Figure 9A:
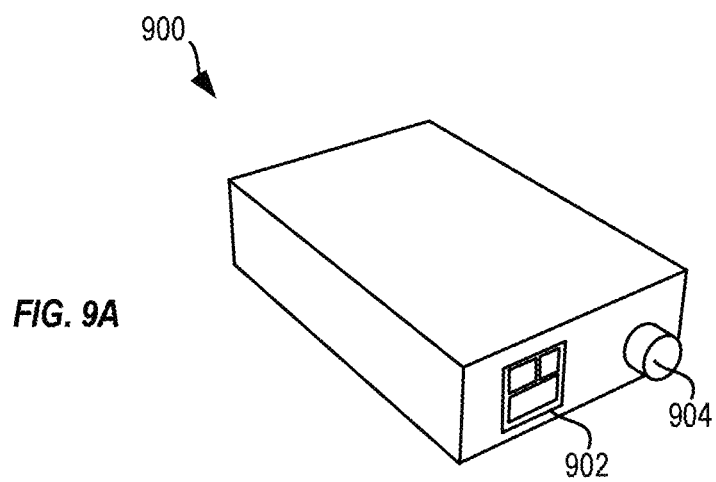
FIGS. 9A-9C depicts various views of an exemplary of an external assembly for housing the external pulse generator in FIGS. 1-8, in one embodiment.
Figure 9B:
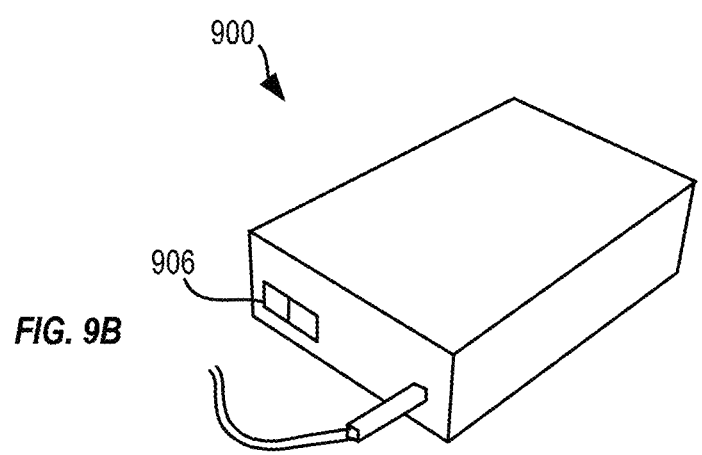
Figure 9C:
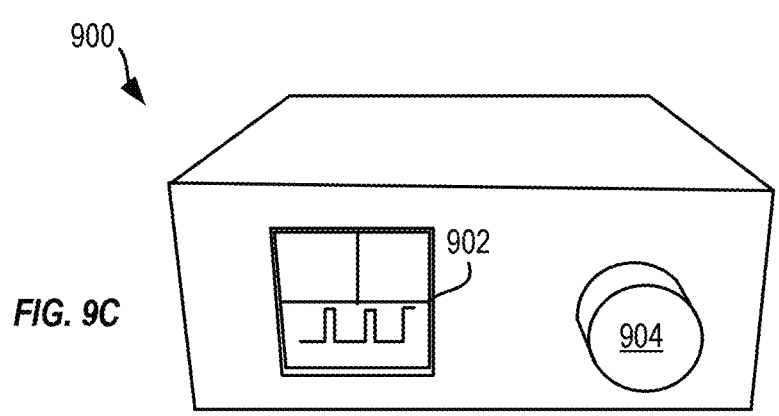

FIG. 9A is a front view of an embodiment of an external assembly, and FIG. 9B is a back view of the same embodiment of a external assembly. FIG. 9C is another front view of an external assembly including a display 902 and knob 904 for displaying and selecting various settings (i.e. settings 128), in one embodiment. The present invention does not require a GUI, nor does the present invention rely on the GUI for operation. However, in this embodiment, the GUI allows the user to quickly and easily see the characteristics of the external assembly.

Example 1

One possible example of an external assembly 900 was assembled according to the schematic shown in FIG. 1. The pedal was electrically connected to the external assembly, and the external assembly was electrically connected to the welder. When the power switch on the pulse box in the off position, the pedal output will go right through the box and into the input of the welder (basically bypassing the pulse box and operation will continue as if the box is not connected). Turning on the power switch on the pulse box enables the pulsing functionality.

Setting the "Hz" to 0.5, "Duty %" to 40, "Amp %" to 50, "Delay" to 1.0, Amp setting on the welder to 150, and the pedal throttle to 100%, each of which may be set using knob 904 and display 902, will yield 150 amps for 0.8 seconds, then 75 amps for 1.2 seconds, then repeated. The pulsing will not start until 1 second has passed, and during this time period the pedal output will pass directly through to the welder. After 1 second has passed, the pulsing will begin as described above.

A test sample external assembly 900 is shown in FIG. 9 and is an example of one embodiment of the present invention. FIG. 9A is a front view of the sample embodiment of an assembled external assembly, while FIG. 9B is a back view of the external assembly showing ports 906 where the pedal 102 and welder 104 connect to the external pulse generator 100. FIG. 9C is a front view of an embodiment of an assembled external assembly including a display 902 displaying the GUI interface.

While there is shown and described herein a certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

Also, while the operation of the external assembly has been discussed and illustrated in relation to a particular sequence of events, it should be appreciated that changes, additions, and omissions to this sequence can occur without materially affecting the operation of the disclosed embodiments, configuration, and aspects.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, embodiments, and configurations after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes (e.g., for improving performance, achieving ease and\or reducing cost of implementation).

The foregoing discussion of the disclosure has been presented for purposes of illustration and description. The foregoing is not intended to limit the disclosure to the form or forms disclosed herein. In the foregoing Detailed Description, for example, various features of the disclosure are grouped together in one or more aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspect, embodiment, and configuration. Thus, the following claims are hereby incorporated into this Detailed Description, with each claim standing on its own as a separate preferred embodiment of the disclosure.

Moreover, though the description of the disclosure has included a description of one or more aspects, embodiments, or configurations and certain variations and modifications thereof, other variations, combinations, and modifications are within the scope of the disclosure (e.g., as may be within the skill and knowledge of those in the art) after understanding the present disclosure. It is intended to obtain rights, which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An external pulse generator, comprising:
   a controller for use with a continuous welding machine and an associated pedal for controlling the continuous welding machine, the controller further comprising a discrete circuitry comprising one or more input pins and one or more output pins, the controller being located between the continuous welding machine and the pedal and being:
   in communication with a pedal input port of the controller for receiving a pedal position input signal from the pedal for controlling the continuous welding machine, the pedal position input signal being a constant waveform signal, and converting the pedal position input signal into a digital value that is coupled to one or more input pins of the discrete circuitry of the controller, in communication with a modified pulsed waveform output port of the controller, the modified puled waveform output port coupled with the continuous welding machine, the discrete circuitry of the controller outputting a modified pulsed waveform signal that is converted into an analog value and coupled to the modified pulsed waveform output port, and in communication with a settings input of the controller for receiving settings identifying waveform characteristic settings comprising a pulse frequency and a wave type of the modified pulsed waveform signal;

wherein the controller is adapted to, in response to the pedal position input signal received from the pedal at the pedal input port of the controller, generate the modified pulsed waveform signal based upon the waveform characteristic settings received from the settings input and couple the modified pulsed waveform signal to the modified pulsed waveform output port of the controller, and the external pulse generator further comprising a power supply, the power supply being an independent power supply.

2. The external pulse generator of claim 1, the pedal position input signal including a pedal potentiometer signal identifying the amount of depression of the pedal by a user.

3. The external pulse generator of claim 1, the pedal position input signal including a pedal depression signal identifying when the pedal is depressed above a threshold.

4. The external pulse generator of claim 2, the pedal position input signal including a pedal depression signal identifying when the pedal is depressed above a threshold.

5. The external pulse generator of claim 4, the controller adapted to generate the modified pulsed waveform when the pedal depression signal is above the threshold.

6. The external pulse generator of claim 1, the power supply including a voltage connection and a ground connection respectively adapted to receive a power and ground input from the welding machine.

7. The external pulse generator of claim 6, further comprising power and ground outputs respectively adapted to send a power and ground signal to the pedal.

8. The external pulse generator of claim 1, the pedal position input signal and the modified pulsed waveform signal being low power signals.

9. The external pulse generator of claim 1, the waveform characteristic settings further comprising at least one of: percent duty cycle, percent amperage, and a time delay.

10. The external pulse generator of claim 1, the modified pulsed waveform signal including a plurality of on pulses and a plurality of off pulses.

11. The external pulse generator of claim 10, the on pulses including a plurality of sub-on pulses and a plurality of sub-off pulses.

12. The external pulse generator of claim 1, further including a display and a rotating knob for respectively displaying and selecting the waveform characteristic settings.

13. The external pulse generator of claim 1, the controller including a brown-out detector for saving the waveform characteristic settings prior to the controller entering an off state.

14. The external pulse generator of claim 1, the pedal position input signal being adapted for controlling the welding machine.

15. The external pulse generator of claim 1, the controller being coupled in series between the continuous welding machine and the associated pedal.

* * * * *